United States Patent
Hong et al.

(10) Patent No.: US 7,736,004 B2
(45) Date of Patent: Jun. 15, 2010

(54) THREE-DIMENSIONAL DISPLAY DEVICE

(75) Inventors: Hyung-Ki Hong, Seoul (KR); Byung-Joo Lee, Gyeonggi (KR); Sung-Min Jung, Incheon (KR); Jun-Un Park, Gyeonggi (KR)

(73) Assignee: LG Display Co., Ltd., Seoul (KR)

( * ) Notice: Subject to any disclaimer, the term of this patent is extended or adjusted under 35 U.S.C. 154(b) by 788 days.

(21) Appl. No.: 11/636,627

(22) Filed: Dec. 11, 2006

(65) Prior Publication Data
US 2007/0296644 A1   Dec. 27, 2007

(30) Foreign Application Priority Data
Jun. 21, 2006 (KR) .................. 10-2006-0055783

(51) Int. Cl.
*G03B 21/00* (2006.01)
(52) U.S. Cl. ............................. 353/7; 348/52
(58) Field of Classification Search .................. 353/7, 353/33, 77, 78, 81, 122; 348/51, 52, 55
See application file for complete search history.

(56) References Cited

U.S. PATENT DOCUMENTS

| | | | |
|---|---|---|---|
| 4,983,031 A * | 1/1991 | Solomon .................... 353/10 |
| 5,764,317 A * | 6/1998 | Sadovnik et al. ............... 349/5 |
| 5,813,742 A * | 9/1998 | Gold et al. .................... 353/88 |
| 6,055,100 A * | 4/2000 | Kirk ............................ 359/457 |
| 6,466,185 B2 * | 10/2002 | Sullivan et al. ................ 345/6 |
| 6,525,847 B2 * | 2/2003 | Popovich et al. .............. 359/15 |
| 6,554,430 B2 * | 4/2003 | Dorval et al. .................. 353/7 |
| 6,608,961 B2 * | 8/2003 | Travis ......................... 385/146 |
| 6,806,849 B2 * | 10/2004 | Sullivan ........................ 345/6 |
| 6,870,671 B2 * | 3/2005 | Travis ......................... 359/443 |
| 6,883,919 B2 * | 4/2005 | Travis ......................... 353/81 |
| 6,961,045 B2 * | 11/2005 | Tsao ........................... 345/103 |
| 6,969,174 B1 * | 11/2005 | Radulescu .................... 353/7 |
| 7,218,430 B2 * | 5/2007 | Batchko ...................... 359/107 |
| 7,224,526 B2 * | 5/2007 | Putilin et al. ................ 359/462 |
| 7,233,441 B2 * | 6/2007 | Sonehara ..................... 359/462 |
| 7,457,040 B2 * | 11/2008 | Amitai, Yaakov ........... 359/629 |
| 7,490,941 B2 * | 2/2009 | Mintz et al. .................... 353/7 |
| 7,525,541 B2 * | 4/2009 | Chun et al. .................. 345/419 |
| 7,537,345 B2 * | 5/2009 | Refai et al. .................... 353/7 |
| 7,548,677 B2 * | 6/2009 | Bathiche et al. ............. 385/129 |
| 7,562,983 B2 * | 7/2009 | Kim et al. ..................... 353/10 |
| 2002/0067467 A1 * | 6/2002 | Dorval et al. ................. 353/10 |
| 2002/0190922 A1 * | 12/2002 | Tsao ........................... 345/32 |

(Continued)

OTHER PUBLICATIONS

"Flat Panel Display Using Projection within a Wedge-Shaped Waveguide", A. Travis, et al. IDRC 2000, p. 292-295, ISSN 1083-1312, Department of Engineering, University of Cambridge, UK.

*Primary Examiner*—Georgia Y Epps
*Assistant Examiner*—Bao-Luan Le
(74) *Attorney, Agent, or Firm*—Morgan Lewis & Bockius LLP

(57) ABSTRACT

A three-dimensional display device includes a plurality of projection portions to project a plurality of images, respectively, a plurality of wedge-shaped light guide plates corresponding to the plurality of projection portions, respectively, to emit the plurality of images, respectively, and a plurality of directional diffuser screen corresponding to the plurality of wedge-shaped light guide plates, respectively, to diffuse or transmit the plurality of images.

9 Claims, 4 Drawing Sheets

U.S. PATENT DOCUMENTS

2003/0020879 A1* 1/2003 Sonehara ................ 353/7
2008/0002159 A1* 1/2008 Liu et al. ................ 353/84
2008/0247013 A1* 10/2008 Smith et al. ................ 359/9

* cited by examiner

THREE-DIMENSIONAL DISPLAY DEVICE

This application claims the benefit of Korean Patent Application No. 10-2006-0055783, filed in Korea on Jun. 21, 2006, which is hereby incorporated by reference.

BACKGROUND OF THE INVENTION

1. Field of the Invention

The present invention relates to a three-dimensional display device, and more particularly, relates to a volumetric type three-dimensional display device.

2. Background of the Related Art

A three-dimensional display uses technology that allows an observer to perceive a three-dimensional effect from a two-dimensional image. This technology has been widely utilized in display-relevant technical fields as well as home appliances, communication, aerospace, art and automobiles. To achieve a three-dimensional effect, a parallax of both eyes, namely, a distance of 65 mm, acts as a primary factor, and mental state and memory act as other factors. Thus, according to three-dimensional information transferred to a user, a three-dimensional display technology may be divided into a volumetric type, a holographic type and a stereoscopic type. Of these types, the volumetric type is suitable for an I-MAX film and has the advantage of supplying large-sized display images.

FIG. 1 is a view schematically illustrating a volumetric type three-dimensional display device 10 according to the related art. As shown in FIG. 1, the volumetric type three-dimensional display device 10 includes first to fourth display portions 20, 30, 40 and 50. The first to fourth display portions 20, 30, 40 and 50 display first to fourth partial images I1, I2, I3 and I4, respectively. The first to fourth partial images I1 to I4 are produced by dividing one image according to depths of the one image. A user 60 synthesizes the first to fourth partial images I1 to I4 as a three-dimensional one image. Also, the user 60 adds positions of the first to fourth display portions 20 to 50, namely, distances from the user 60 to the first to fourth display portions 20 to 50, into image information of the first to fourth partial images I1 to I4, thereby perceiving the one image as a three-dimensional image.

However, the related art volumetric type three-dimensional display device 10 has the following limitations and disadvantages. Each display portion should display the display image produced by itself, and also should transmit the display images produced by the display portions behind it. Specifically, the second display portion 30 should transmit the first partial image I1 produced by the first display portion 20, the third display portion 40 should transmit the first and second partial images I1 and I2 produced by the first and second display portions 20 and 30, and the fourth display portion 40 should transmit the first to third partial images I1 to I3 produced by the first to third display portions 20 to 30. Accordingly, qualification of the display portion is limited. For this reason, emissive type display devices, such as organic electroluminescent display devices, field emission display devices, plasma display devices and the like, can not be used as the display portion of the volumetric type three-dimensional display device.

While a non-emissive type display device, such as a liquid crystal display device, can be used for the display portion, it is difficult to set up a light source such as a backlight unit. When the non-emissive type display device has a low transmissivity, the partial images should pass through a plurality of non-emissive type display devices, thereby decreasing the brightness. Accordingly, a projection type display device is used as the display portion. The projection type display device generally needs a large complicated optical portion and a screen where an image is projected. When the projection type display device is adopted for the volumetric type three-dimensional display device, a distance between the screens should be long enough to set up the optical portion. However, due to the long distance, the user may not normally perceive the three-dimensional one image synthesized from the partial images.

SUMMARY OF THE INVENTION

Accordingly, the present invention is directed to a three-dimensional display device that substantially obviates one or more of the problems due to limitations and disadvantages of the related art.

An object of the present invention is to provide a three-dimensional display device with improved performance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, according to an aspect of the present invention, the three-dimensional display device includes a plurality of projection portions to project a plurality of images, respectively, a plurality of wedge-shaped light guide plates corresponding to the plurality of projection portions, respectively, to guide the plurality of images, respectively, substantially toward a same direction, and a plurality of directional diffuser screen corresponding to the plurality of wedge-shaped light guide plates, respectively, to diffuse or transmit the plurality of images.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
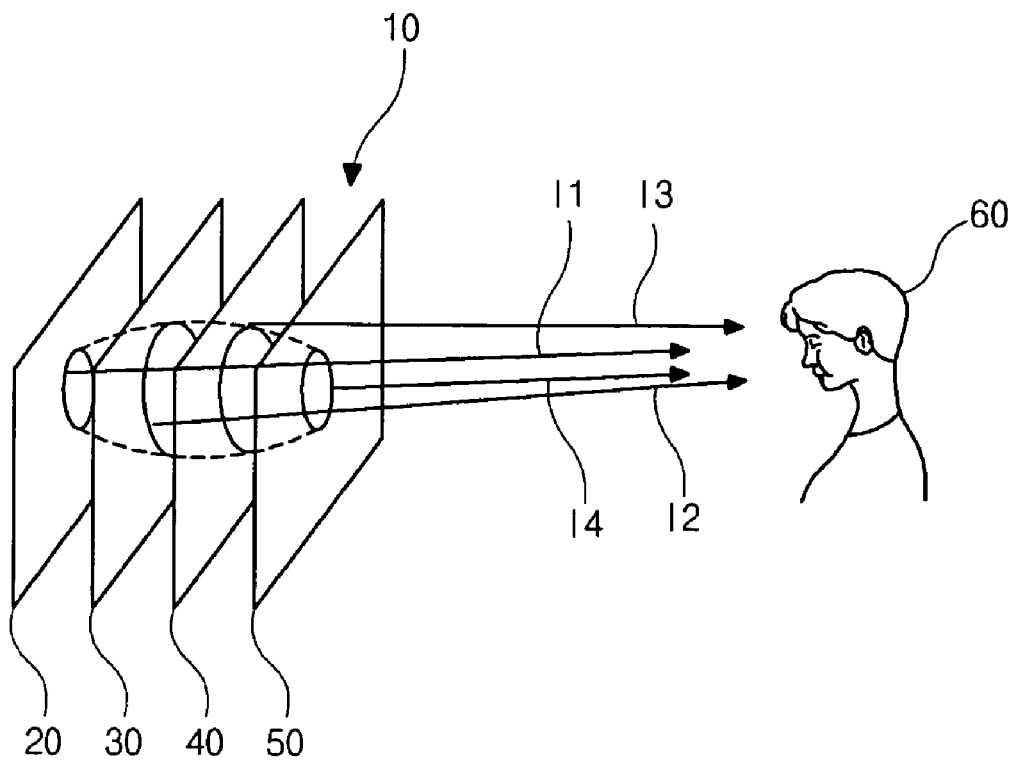
FIG. 1 is a view schematically illustrating a volumetric type three-dimensional display device according to the related art.
Figure 2:
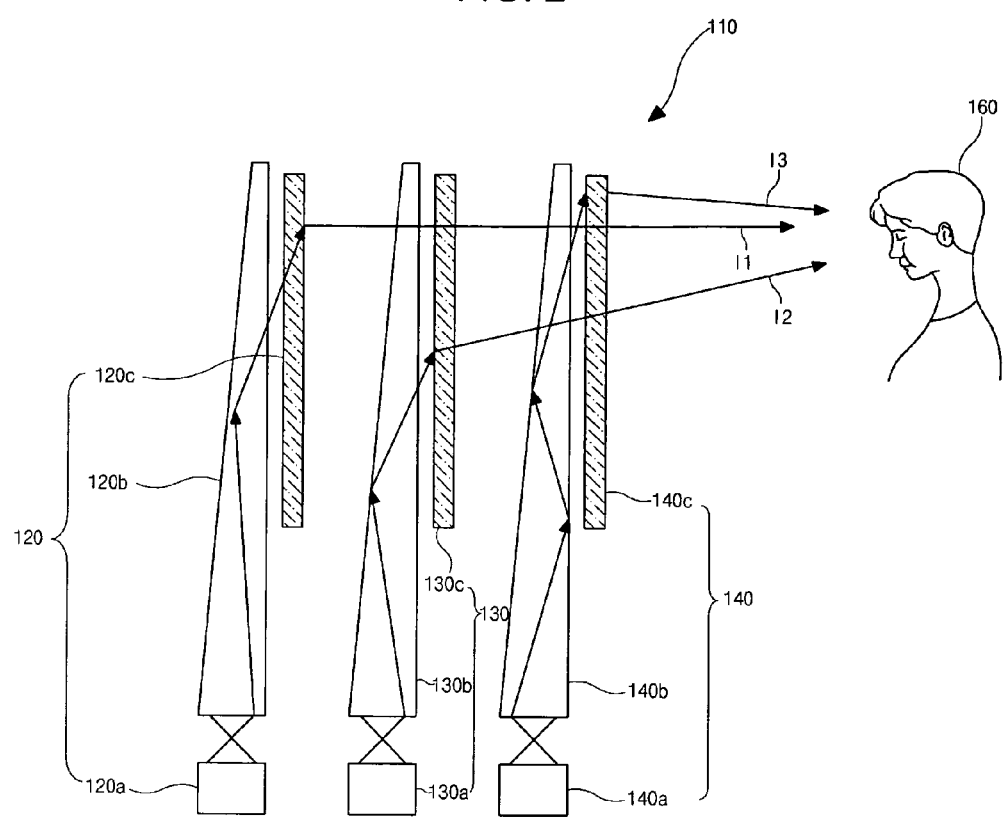
FIG. 2 is a view schematically illustrating a volumetric type three-dimensional display device according to an exemplary embodiment of the present invention.

FIG. 2 is a view schematically illustrating a volumetric type three-dimensional display device 110 according to an exemplary embodiment of the present invention. As shown in FIG. 2, the volumetric type three-dimensional display device 110 includes first, second and third display portions 120, 130 and 140. The first to third display portions 120 to 140 are sequentially disposed far to near from a user 160. The first to third display portions 120 to 140 are spaced apart from each other.

The first display portion 120 is disposed the farthest from the user 160 and includes a first projection portion 120a, a first wedge-shaped light guide plate 120b and a first directional diffuser screen 120c. The first display portion 120 serves to supply a first partial image I1 to the user 160. The second display portion 130 is disposed between the first and third display portions 120 and 140 and includes a second projection portion 130a, a second wedge-shaped light guide plate 130b and a second directional diffuser screen 130c. The second display portion 130 serves to supply a second partial image I2 to the user 160. The third display portion 140 is disposed the nearest to the user 160 and includes a third projection portion 140a, a third wedge-shaped light guide plate 140b and a third directional diffuser screen 140c. The third display portion 140 serves to supply a third partial image I3 to the user 160.

Each of the first to third projection portions 120a to 140a includes a display panel that produces each of the partial images I1 to I3. The first to third wedge-shaped light guide plates 120b to 140b guide the respective partial images I1 to I3 substantially toward the same direction. The first to third directional diffuser screens 120c to 140c are arranged parallel with and apart from each other. The first to third display portions 120 to 140 display the first to partial images I1 to I3 in a similar manner. For example, the first projection portion 120a is disposed below the first wedge-shaped light guide plate 120b, so as to project the first partial image I1 into the first wedge-shaped light guide plate 120b. The first partial image I1 is projected to be reflected repeatedly on a front surface and a rear surface of the first wedge-shaped light guide plate 120b. In other words, the first partial image I1 is repeatedly reflected on the front and rear surfaces of the first wedge-shaped light guide plate 120b while an incidence angles of the first partial image I1 on the front and rear surfaces is varied. When the incidence angle of the first partial image I1 is equal to or less than a specific incidence angle, the first partial image I1 is not reflected but emitted outside the first wedge-shaped light guide plate 120b. The emitted first partial image I1 is thus diffused by the first directional diffuser screen 120c and transferred to the user 160. The first directional diffuser screen 120c diffuses or intactly transmits an incident light thereon according to an incidence angle of the incident light. For example, an incident light having an incidence angle within a specific range is diffused, whereas an incident light having another incidence angle, which is outside the specific range, is directly transmitted.

A display operation of the second display portion 130 is similar to that of the first display portion 120. The second projection portion 130a is disposed below the second wedge-shaped light guide plate 130b so as to project the second partial image I2 into the second wedge-shaped light guide plate 130b. The second partial image I2 is projected to be reflected repeatedly on a front surface and a rear surface of the second wedge-shaped light guide plate 130b. In other words, the second partial image I2 is repeatedly reflected on the front and rear surfaces of the second wedge-shaped light guide plate 130b while an incidence angle of the second partial image I2 on the front and rear surfaces is varied. When the incidence angle of the second partial image I2 is equal to or less than a specific incidence angle, the second partial image I2 is not reflected but emitted outside the second wedge-shaped light guide plate 130b. The emitted second partial image I2 is thus diffused at the second directional diffuser screen 130c and transferred to the user 160. The second directional diffuser screen 130c diffuses or intactly transmits an incident light thereon according to an incidence angle of the incident light. For example, an incident light having an incidence angle within a specific range is diffused, whereas an incident light having another incidence angle, which is outside the specific range, is directly transmitted.

A display operation of the third display portion 140 is similar to those of the first and second display portions 120 and 130. The third projection portion 140a is disposed below the third wedge-shaped light guide plate 140b to project the third partial image I3 into the third wedge-shaped light guide plate 140b. The third partial image I3 is projected to be reflected repeatedly on a front surface and a rear surface of the third wedge-shaped light guide plate 140b. In other words, the third partial image I3 is repeatedly reflected on the front and rear surfaces of the third wedge-shaped light guide plate 140b while an incidence angle of the third partial image I3 on the front and rear surfaces is varied. When the incidence angle of the third partial image I3 is equal to or less than a specific incidence angle, the third partial image I3 is not reflected but emitted outside the third wedge-shaped light guide plate 140b. The emitted third partial image I3 is diffused at the third directional diffuser screen 140c and transferred to the user 160. The third directional diffuser screen 140c diffuses or intactly transmits an incident light thereon according to an incidence angle of the incident light. For example, an incident light having an incidence angle within a specific range is diffused, whereas an incident light having another incidence angle, which is outside the specific range, is directly transmitted.

As a result, the user 160 receives and synthesizes the first to third partial images I1 to I3, thereby perceiving those as a three-dimensional image. Because each of the first to third wedge-shaped light guide plates 120b to 140b or each of the first to third directional diffuser screens 120c to 140c does not have a separate layer or a pattern that reduces transmissivity, the volumetric type three-dimensional display device 110 of the exemplary embodiment having the first to third display portions 120 to 140 can realize high transmissivity. Because the first to third display portions 120 to 140 use the first to third wedge-shaped light guide plates 120b to 140b instead of large optical portions of the related art, a set-up space for the large optical portion is omitted and a distance between the display portions 120 to 140 is minimized, thereby optimizing a three-dimensional effect.

In the exemplary embodiment, three display portions 120 to 140 are described above. However, it is noted that the number of the display portions is not limited and can be varied.

Figure 3:
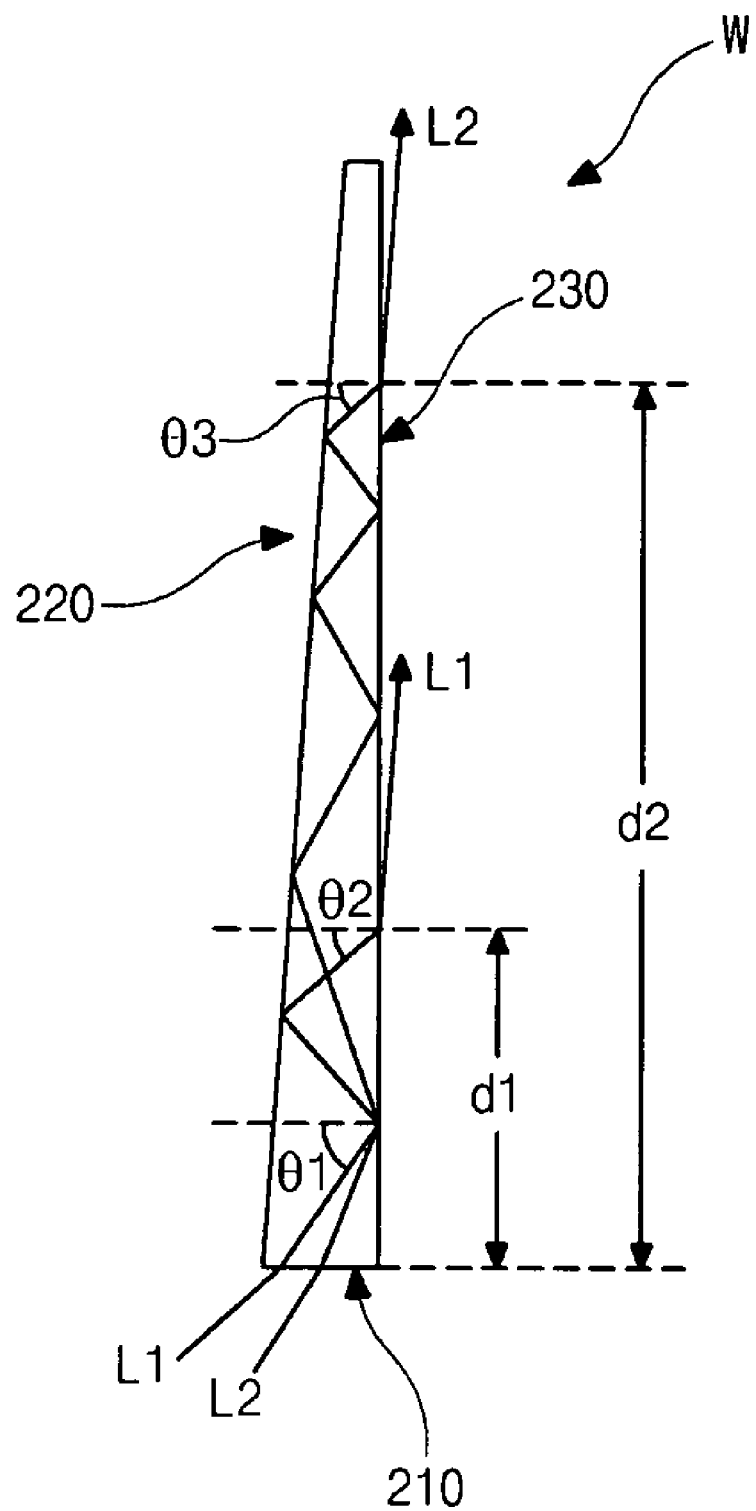
FIG. 3 is a view schematically illustrating a wedge-shaped light guide plate of the volumetric type three-dimensional display device according to the exemplary embodiment of the present invention.

FIG. 3 is a view schematically illustrating a wedge-shaped light guide plate W of the volumetric type three-dimensional display device according to the exemplary embodiment. The wedge-shaped light guide plate W of FIG. 3 is an example of the first to third wedge-type light guide plates 120b to 140b of FIG. 2. As shown in FIG. 3, the wedge-shaped light guide plate W may include a first surface 210 on which light is incident, and second and third surfaces 220 and 230 that face each other. The second surface 220 is inclined with respect to the third surface 230.

Although not shown in the drawings, a projection portion is disposed below the first surface 210 to supply a partial image, as described in FIG. 2. To explain a light path in the wedge-shaped light guide plate W, first and second lights L1 and L2 from the partial image will be described below. The first and second lights L1 and L2 are incident on the first surface 210 with different incidence angles. The first and second lights L1 and L2 are repeatedly reflected on the second and third surfaces 220 and 230 until the first and second lights L1 and L2 have incidence angles on the third surface 230 equal to or less than specific incidence angles. For example, the first light L1 passes through the first surface 210 and has a first incidence angle θ1 on the third surface 230. Since the first incidence angle θ1 is larger than a critical angle θc that is for a total reflection of the first light L1, the first light L1 is reflected by the third surface 230 to the second surface 220. Since the second and third surfaces 220 and 230 are inclined with respect to each other, the first light L1 is reflected by the second surface 220, and has a second incidence angle θ2 less than the first angle θ1 when it is incident on the third surface 230. In this manner, as the first light L1 is repeatedly reflected on the second and third surfaces 220 and 230, the incidence angle of the first light L1 on the third surface 230 is reduced. When the second incidence angle θ2 is less than the critical angle θc, the first light L1 incident on the third surface 230 is not reflected by the third surface 230 but emitted outward. The critical angle θc depends on a refractive index of a material of the wedge-shaped light guide plate W. In other words, the critical angle θc is controlled by the material of the wedge-shaped light guide plate W.

Similar to the first light L1, the second light L2 is also emitted outward when the second light L2 has an incident angle on the third surface 230 less than the critical angle θc by being repeatedly reflected on the second and third surfaces 220 and 230. Because the first and second lights L1 and L2 are incident differently on the first surface 210, the first and second lights L1 and L2 may be emitted outward at different positions of the wedge-shaped light guide plate W. For example, the first light L1 may be emitted at a position that has a first distance d1 away from the first surface 210, whereas the second light L2 may be emitted at a position that has a second distance d2 away from the first surface 210.

As described above, the wedge-shaped light guide plate W receives an image through the first surface 210 having a narrow width and projects the image through the third surface having a wide width. Thus, the volumetric type three-dimensional display device using the wedge-shaped light guide plate does not need a set-up space for an optical portion of the related art.

Figure 4:
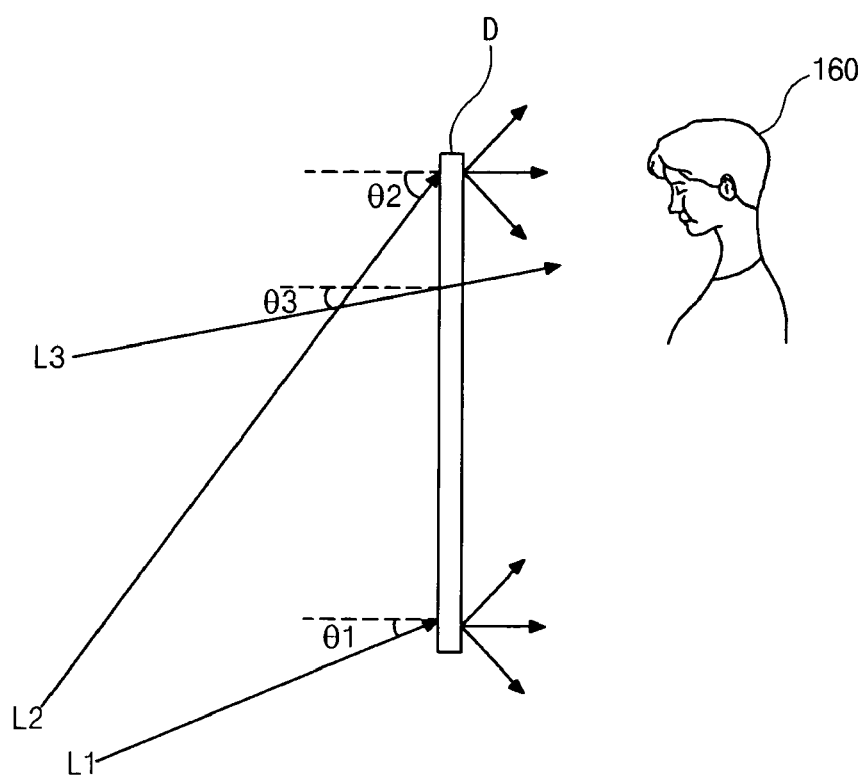
FIG. 4 is a view schematically illustrating a directional diffuser screen of the volumetric type three-dimensional display device according to the exemplary embodiment of the present invention.

FIG. 4 is a view schematically illustrating a directional diffuser screen of the volumetric type three-dimensional display device according to the exemplary embodiment of the present invention. The directional diffuser screen D of FIG. 4 is an example of the first to third directional diffuser screens 120c to 140c of FIG. 2. As shown in FIG. 4, when first to third lights L1 to L3 are incident on the directional diffuser screen D with different incidence angles, the directional diffuser screen D diffuses lights having a specific condition and intactly transmits other lights. Specifically, the directional diffuser screen D diffuses lights having an incidence angle between a first incidence angle θ1 and a second incidence angle θ2, and the directional diffuser screen D intactly transmits lights having other incidence angles. In other words, a partial image produced by a display portion having the directional diffuser screen D includes lights having incidence angles between the first incidence angle θ1 and the second incidence angle θ2. Because the lights for the partial image have the incidence angles between the first and second incidence angles ƒ1 and θ2, the lights for the partial image are all diffused by the directional diffuser screen D. On the contrary, lights having incidence angles not between the first and second angles θ1 and θ2, namely, less than the first incidence angle θ1 and more than the second incidence angle θ2, is not diffused but directly transmitted by the directional diffuser screen D. For example, as shown in FIG. 4, the third light L3 has a third incidence angle θ3 that is less than the first incidence angle θ1, and therefore intactly passes through the directional diffuser screen D and is transferred to the user 160.

As described above, the directional diffuser screen D serves as a screen when the light has an incidence angle within the range of θ1 to θ2, and the directional diffuser screen D serves as a transparent plate when the light is not within the incidence angle range. Accordingly, the directional diffuser screen D serves as a screen for a partial image produced by the display portion having the directional diffuser screen D, and the directional diffuser screen serves as a transparent plate produced by other display portions behind the display portion having the directional diffuser screen D. According to such an arrangement, the volumetric type three-dimensional display device using the directional diffuser screen D can increase brightness.

The display panel of the display portion as described in the above exemplary embodiments may include a flat display panel, for example, a liquid crystal display (LCD), a field emission display (FED), a plasma display panel (PDP) and a electroluminescent display (EL).

It will be apparent to those skilled in the art that various modifications and variations can be made in the three-dimensional display device of the present invention without departing from the spirit or scope of the invention. Thus, it is intended that the present invention covers the modifications and variations of this invention provided they come within the scope of the appended claims and their equivalents.

What is claimed is:

1. A three-dimensional display device comprising:
a plurality of projection portions to project a plurality of images, respectively;
a plurality of wedge-shaped light guide plates arranged corresponding to the plurality of projection portions, respectively, to guide the plurality of images, respectively; and
a plurality of directional diffuser screens arranged corresponding to the plurality of wedge-shaped light guide plates, respectively, to diffuse or transmit the plurality of images.

2. The device according to claim 1, wherein the plurality of wedge-shaped light guide plates each include a first surface on which a corresponding image is incident, and second and third surfaces facing and inclined with each other.

3. The device according to claim 2, wherein the corresponding image is repeatedly reflected on the second and third surfaces and is emitted at the third surface.

4. The device according to claim 3, wherein an incidence angle of the corresponding image on the third surface is reduced as the corresponding image is repeatedly reflected on the second and third surfaces.

5. The device according to claim 4, wherein the corresponding image is emitted when the incidence angle of the corresponding image on the third surface is less than a critical angle for a total reflection at the third surface.

6. The device according to claim 1, wherein the plurality of directional diffuser screens diffuse or transmit the plurality of images according to incidence angles of the plurality of images on the plurality of directional diffuser screens.

7. The device according to claim 6, wherein one of the plurality of directional diffuser screens diffuses one of the plurality of images emitted from its corresponding wedge-shaped light guide plate, and transmits other images emitted from other wedge-shaped light guide plates.

8. The device according to claim 1, wherein the plurality of directional diffuser screens are arranged parallel with and apart from each other.

9. The device according to claim 1, wherein the plurality of projection portions each include a liquid crystal display (LCD), a field emission display (FED), a plasma display panel (PDP) or a electroluminescent display (EL).

* * * * *